United States Patent [19]

Verma

[11] 4,180,610

[45] Dec. 25, 1979

[54] ARTICLE COATED WITH A WATER BASED ALKYD RESIN PRIMER

[75] Inventor: Monica H. Verma, Troy, Mich.

[73] Assignee: E. I. Du Pont de Nemours and Company, Wilmington, Del.

[21] Appl. No.: 905,968

[22] Filed: May 15, 1978

Related U.S. Application Data

[60] Division of Ser. No. 858,183, Dec. 7, 1977, Pat. No. 4,116,904, and a continuation-in-part of Ser. No. 738,855, Nov. 4, 1976, abandoned.

[51] Int. Cl.$^2$ ............................................... B32B 9/04
[52] U.S. Cl. .................................. 428/216; 428/458; 428/334
[58] Field of Search ............... 428/334, 458; 260/22 R, 22 T, 23 ST, 29.2 N, 29.2 E, 29.2 UA, 29.6 S; 106/14.14; 428/216

[56] References Cited

U.S. PATENT DOCUMENTS

| | | | |
|---|---|---|---|
| 2,702,284 | 2/1955 | Brock | 260/23.7 |
| 2,932,580 | 4/1960 | Clark et al. | 106/308 |
| 3,269,967 | 8/1966 | Broadhead | 260/22 |
| 3,287,295 | 11/1966 | Hahn | 260/22 |
| 3,376,241 | 4/1968 | Que | 260/29.2 UA |
| 3,463,750 | 8/1969 | Ghosh | 260/29.2 UA |
| 3,474,060 | 10/1969 | Phein et al. | 260/29.2 UA |
| 3,646,099 | 2/1972 | Dannals | 260/465.4 |
| 3,660,330 | 5/1972 | Phein et al. | 260/29.2 UA |
| 3,709,846 | 1/1973 | Tsou | 260/29.2 E |
| 3,761,433 | 9/1973 | High | 260/29.2 UA |
| 3,894,978 | 7/1975 | Montesissa et al. | 260/29.2 UA |
| 4,056,495 | 11/1977 | Kawamura et al. | 428/458 |
| 4,081,411 | 3/1978 | Hunsucker | 260/29.2 F |

FOREIGN PATENT DOCUMENTS

| | | |
|---|---|---|
| 748475 | 10/1970 | Belgium. |
| 803346 | 2/1974 | Belgium. |
| 2416658 | 4/1974 | Fed. Rep. of Germany. |
| 35434 | 11/1970 | Japan. |
| 31342 | 9/1971 | Japan. |
| 13183 | 4/1972 | Japan. |

*Primary Examiner*—George F. Lesmes
*Assistant Examiner*—E. Rollins Buffalow

[57] ABSTRACT

An aqueous primer composition useful for priming substrates such as steel, polyester reinforced with fiberglass, acrylonitrile/butadiene/styrene plastics that are used in automobile and truck bodies and can be dried at ambient temperatures comprises a binder of an alkyd resin which is the esterification product of drying oil fatty acids, an aromatic dicarboxylic acid, an anhydride of an aromatic tricarboxylic acid and a polyhydric alcohol such as an alkyd resin of soya oil fatty acids, phthalic acid, trimellitic anhydride and trimethylol propane;

pigments in a pigment to binder ratio of about 300/100 to 10/100; typical pigments are talc, barytes, and zinc/calcium molybdate; and about 0.05–1.0% by weight of an anionic polyelectrolyte dispersant; and a sufficient amount of ammonia or an amine such as triethyl amine to provide a pH of about 6.5–8.5.

8 Claims, No Drawings

ARTICLE COATED WITH A WATER BASED ALKYD RESIN PRIMER

CROSS REFERENCE TO RELATED APPLICATIONS

This application is a continuation-in-part application of Ser. No. 738,855 filed Nov. 4, 1976 now abandoned and a division of Ser. No. 858,183 filed Dec. 7, 1977, now U.S. Pat. No. 4,116,904.

BACKGROUND OF THE INVENTION

This invention is related to a primer composition and in particular to an aqueous primer composition.

It has become increasingly important for paint manufacturers to provide coating compositions that are non-air polluting and that can be dried at ambient temperatures to save energy. Along with the above characteristics, the automotive and truck body repair industry have requirements that primers have excellent adhesion to all types of painted and unpainted substrates, provide good resistance to corrosion, can be easily sanded to give a smooth surface and that provide a surface to which conventional refinish paints will adhere. Conventional alkyd resin primers are well known but none have a combination of properties that meet the above requirements whereas the novel aqueous primer composition of this invention meets these requirements.

SUMMARY OF THE INVENTION

An aqueous primer composition useful for priming substrates containing 5–50% by weight of film-forming binder and 50–95% by weight of an aqueous medium;
 wherein the binder consists essentially of an alkyd resin which is the esterification product of drying oil fatty acids, an aromatic dicarboxylic acid, an anhydride of an aromatic tricarboxylic acid and a polyhydric alcohol, and
 about 0.05–1.0% by weight, based on the weight of the composition, of an anionic polyelectrolyte dispersant; the composition contains a sufficient amount of ammonia or an amine to provide the composition with a pH of 6.5–8.5.

DETAILED DESCRIPTION OF THE INVENTION

The aqueous primer composition contains about 5–50% by weight of film-forming binder. Generally, about 20–40% by weight of binder is used. The remainder of the composition is an aqueous medium that contains water and dispersants. Optionally, the aqueous medium contains water soluble or water miscible solvents and dispersants.

Usually the primer contains dispersed pigments in a pigment-to-binder weight ratio of about 300/100 to 10/100. Typical pigments that are used are talc, barytes, zinc molybdate, calcium molybdate basic zinc/calcium molybdate, zinc oxide, calcium phosphosilicate and mixtures thereof. These pigments provide excellent corrosion resistance to the primer. Other pigments can be added for color such as red and yellow iron oxides, carbon black, titanium dioxide, and the like.

The alkyd resin used in the primer composition is the esterification product of drying oil fatty acids, an aromatic dicarboxylic acid, an anhydride of an aromatic tricarboxylic acid and a polyhydric alcohol. To prepare to alkyd resin, the above constituents along with an esterification catalyst are charged into a reaction vessel. Either a conventional fusion or solution process using conventional equipment can be used to prepare the alkyd resin. Generally, reaction temperatures of about 200°–275° C. for 1 to 5 hours are used to prepare the resin. The resulting alkyd resin has an acid number of about 20–100.

Typical solvents that can be used in the solution process are water miscible or water soluble and are as follows: ethers, aliphatic alcohols such as methanol, ethanol, propanol, isopropanol, butanol, ethylene glycol monoalkyl ethers, such as ethylene glycol monobutyl ether, propylene glycol monopropyl ether, ethylene glycol monoalkyl ether acetates, and the like.

Typical esterification catalysts that are used in the process for preparing alkyd resins are as follows: barium oxide, barium hydroxide, barium naphthenate, calcium oxide, calcium hydroxide, calcium naphthenate, lead oxide, lithium hydroxide, lithium naphthenate, lithium ricinoleate, sodium hydroxide, sodium naphthenate, zinc oxide, and lead tallate.

Typical drying oils fatty acids that are used to prepare alkyd resins are as follows: dehydrated castor oil fatty acids, heat-bodied soya oil fatty acids, tung oil fatty acids, linseed oil fatty acids, oiticica oil fatty acids, safflower oil fatty acids, soya oil fatty acids, and the like.

Typical aromatic dicarboxylic acids that can be used to prepare the alkyd resin are as follows: isophthalic acid, terephthalic acid, phthalic acid. Phthalic anhydride can also be used.

Typical aromatic tricarboxylic acids or their anhydrides that can be used to prepare the alkyd resin are as follows: trimelletic acid, trimelletic anhydride, trimesic acid and the like.

Typical polyhydric alcohols that can be used to prepare alkyd resins are as follows: ethylene glycol, propylene glycol, 1,3-butylene glycol, pentanediol, neopentyl glycol, hexylene glycol, diethylene glycol, dipropylene glycol, triethylene glycol, glycerol, trimethylolethane, trimethylolpropane, pentaerythritol, methylglucoside, dipentaerythritol, and sorbitol.

Monobasic organic acids also can be used to prepare alkyd resins and are as follows: abietic acid, benzoic acid, p-tert-butylbenzoic acid, caproic acid, caprylic acid, caproic acid, crotonic acid, 2-ethylhexoic acid, lauric acid, pelargonic acid, rosin acids, and the like.

Monofunctional alcohols also can be used to prepare alkyd resins and are as follows: butanol, pentanol, hexanol, isooctanol, ethoxyethanol, and butyl carbitol.

Drying oils also can be used to prepare the alkyd resin such as castor oil, heat bodied soya oil, soya oil, corn oil, dehydrated castor oil, linseed oil, oiticica oil, safflower oil and tung oil.

One particularly preferred alkyd resin that forms a high quality composition is the esterification product of soya oil fatty acids/phthalic acid/trimelletic anhydride/trimethylol propane that has an acid number of about 20–100.

The alkyd resin is dispersed in water by mixing the resin an amine or ammonia and then with water. A sufficient amount of an amine or ammonia used to provide the resulting composition with a pH of about 6.5–8.5. Generally, the pH of the primer composition is about 7–8.

Typical amines that can be used are triethylamine, trimethylamine, ethanolamine, N,N-diethylethanolamine, N,N-dimethylethanolamine, N-methylethanolamine, monoisopropanolamine, butanolamine, ethylenediamine, diethylamine and the like. Triethylamine and N,N-dimethylethanol amine are preferred since these amines form good quality products.

Generally, about 0.05 to 1.0% by weight, based on the weight of the composition, of a dispersant is added. Typically useful dispersants are anionic polyelectrolytes such as Polywet ND-1 and Polywet ND-2. Preferred, anionic polyelectrolyte dispersants are polymers of acrylonitrile, a metal polyacrylate such as a polyacrylate and are terminated with sodium sulfonate. One particularly useful dispersant of this type has the formula

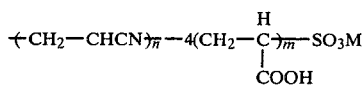

where n and m are sufficiently large to provide a molecular weight of about 500-2500 and M is an alkali metal ion such as sodium. Preparation of these dispersants are taught in Dannals U.S. Pat. No. 3,646,099 issued Feb. 29, 1972.

Driers usually are added in amounts of 0.1 to 1.0% by weight based on the weight of the composition. Typical driers are cobalt naphthenate, managanese naphthenate, nickel naphthenate, nickel octoate zirconium octate, lead tallate and the like.

As aforementioned, the composition is pigmented for most uses. The pigments are formed into a mill base by grinding the pigment with a water dispersible resin, water and an amine and the resulting mill base is added to an aqueous alkyd resin dispersion to form a pigmented primer composition. The mill base is prepared by conventional grinding techniques such as sand grinding, ball milling, attritor grinding and the like. Generally, the water dispersible resin used in the mill base is the same as the binder used in the primer. Usually, one of the aforementioned dispersants is added to aid in dispersing pigments.

The primer composition can be applied to a variety of substrates such as metal, painted metal, wood, glass, fiberglass reinforced with polyester resin, plastics and the like by any of the conventional application methods such as spraying, electrostatic spraying, dipping, brushing, flow coating, roller coating and the like. Water or solvents can be added to the composition to adjust the viscosity of the composition for the application method. The resulting coatings can be dried at ambient temperatures or baked at relatively low temperatures up to about 140° C. for about 5 minutes to 2 hours. The resulting coating is about 0.1-5 mils thick and if pigmented can be easily sanded to provide a smooth surface.

The composition has excellent adhesion to all types of substrates such as bare metal, metal painted with an acrylic enamel, acrylic lacquer, acrylic dispersion enamel, acrylic dispersion lacquer, alkyd enamel, conventional alkyd or epoxy primers or fiberglass reinforced with polyester painted as above or acrylonitrile butadiene/styrene plastics painted as above. Conventional refinish acrylic enamels or lacquers can be applied over the primer composition and provide a high quality topcoat finish. Usually about a 1-5 mil thick acrylic topcoat is applied. The aforementioned characteristics make the composition particularly useful as a primer used in the repair of automobiles and truck bodies.

The following example illustrates the invention. All quantities are on a weight basis unless otherwise indicated.

EXAMPLE

A water based pigment dispersion is prepared as follows:

| Portion 1 | Parts by Weight |
|---|---|
| Alkyd resin solution (80% solids alkyd resin of soya oil fatty acids/phthalic acid/trimethylol propane/ trimellitic anhydride having an acid no. of 50-60 in a propyleneglycol monopropyl ether solvent). | 1730 |
| Ethylene glycol monobutyl ether | 35 |
| Anionic polyelectrolyte dispersant (Polywet ND-1 dispersant made by Uniroyal which is believed to be a polymer of acrylonitrile/polyacrylate terminated with sodium sulfonate prepared according to U.S. Pat. No. 3,646,099) | 08 |
| Loss of Dry Inhibitor solution (Nyact ® NOPB metallic soap of calcium and zinc in mineral spirits made by Tenneco Chemicals) | 54 |

| Portion 2 | Parts by weight |
|---|---|
| Deionized water | 2284 |
| Triethylamine | 92 |

| Portion 3 | |
|---|---|
| Talc pigment | 814 |
| Barytes pigment | 3475 |
| Molywhite 212 pigment (Basic zinc/calcium molybdate pigment made by Sherwin Williams) | 927 |
| Iron oxide | 581 |
| Total | 10,000 |

Portion 1 is charged into a mixing vessel and thoroughly mixed. Portion 2 is added with mixing and mixing is continued for 15 minutes. The pH of the resulting mixture is adjusted to 7.0-7.2 by the addition of triethylamine. Portion 3 is then added with mixing and mixing is continued until a smooth mixture is obtained. This mixture is charged into a conventional ballmill and ground for 48,000 cycles. The resulting mixture is a pigment dispersion having a weight solids of about 72%, a pH of about 7.5-7.8 and a pigment to binder ratio of 408.96/100 where the binder is the alkyd resin in the dispersion.

A primer is prepared as follows:

| Portion 1 | Parts by Weight |
|---|---|
| Alkyd resin solution (described above) | 1205 |
| Ethylene glycol monobutylether | 319 |
| Cobalt naphthenate solution (54% solids in mineral spirits and contains 6% cobalt) | 26 |
| Drier stabilizer solution (35% solution of 1,10 phenanthroline and 2-ethylhexoic acid in n-butanol) | 08 |
| Methyl ethyl ketoxime | 8 |

| Portion 2 | |
|---|---|
| Deionized water | 1291 |
| Triethylamine | 90 |
| Pigment dispersion (prepared above) | 7053 |

| | | |
|---|---|---|
| -continued | | |
| | Total | 10,000 |

Portion 1 is charged into a mixing vessel and thoroughly mixed and then Portion 2 is added and thoroughly mixed to form a primer. The pH of the primer is adjusted to about 7.7 by the addition of triethylamine.

The resulting primer has a weight solid of about 60% and a pigment to binder ratio of about 206/100 where the binder is the alkyd resin in the primer. Sufficient deionized water is mixed with the primer to reduce the viscosity of the primer to 30 seconds determined by a No. 2 Zahn cup at 25° C.

The resulting primer is sprayed onto phosphatized steel panels and dried at room temperature (about 25° C.) for about 60 minutes and forms a finish about 0.8 mil in thickness that has a gloss measured at 20° of 1 and a gloss measured at 60° of 16, that has a hardness after three days of 4–5 knoops, that has a tape adhesion of 10 measured on a scale of 1–10 where 10 indicates no loss of adhesion when the tape is removed, and that can be easily sanded to remove any imperfections in the surface of the primer.

Conventional finishes of an acrylic lacquer, an acrylic dispersion lacquer, an acrylic enamel, an acrylic dispersion enamel, an acrylic water based enamel, an alkyd enamel or a polyurethane enamel can be applied to metal substrates having a primer coating of the above primer. These finishes have excellent adhesion to the primer, have an excellent appearance, good weathering properties even after long periods of outdoor exposure and good corrosion resistance.

The claims are:

1. An article comprising a substrate coated with a 0.1–5 mil thick layer of the dried coalesced primer composition wherein the primer is from an aqueous composition comprising 5–50% by weight of a film-forming binder and 50–90% by weight of an aqueous medium; wherein the binder consists essentially of
    an alkyd resin which is the esterification product of soya oil fatty acids, phthalic acid, trimellitic anhydride and trimethylol propane having an acid number of 20–100; and
    the composition contains pigment in a pigment to binder weight ratio of about 300/100 to 10/100 in which the pigment is a mixture of talc, barytes and zinc/calcium molybdate and
    about 0.05–1.0% by weight, based on the weight of the composition, of an anionic polyelectrolyte dispersant;
    the composition containing sufficient ammonia or an amine to provide the composition with a pH of 6.5–8.5.

2. The article of claim 1 in which the substrate is metal.

3. The article of claim 2 in which the metal has a phosphate coating.

4. The article of claim 1 in which the amine of the primer is triethylamine.

5. The article of claim 1 in which the dispersant of the primer is a polymer of acrylonitrile, a polyacrylate and terminated with a sulfonate.

6. The article of claim 5 in which the dispersant of the primer is a polymer of the formula

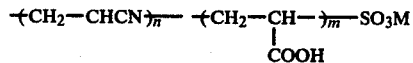

where n and m are positive integers to provide a molecular weight of about 500–2500 and M is an alkali metal.

7. The article of claim 6 where M of the dispersant is sodium.

8. The article of claim 2 having a 1–5 mil thick layer of an acrylic or alkyd resin topcoating in adherence to the primer layer.

* * * * *